(12) United States Patent
Rudin et al.

(10) Patent No.: US 9,904,870 B2
(45) Date of Patent: *Feb. 27, 2018

(54) REGISTRATION AND COMPARISON OF THREE-DIMENSIONAL OBJECTS

(71) Applicant: Cognitech, Inc., Pasadena, CA (US)

(72) Inventors: Leonid I. Rudin, San Marino, CA (US); Jose L. Lisani, Pasadena, CA (US); Jean-Michel Morel, Paris (FR)

(73) Assignee: Cognitech, Inc., Pasadena, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/960,113

(22) Filed: Dec. 4, 2015

(65) Prior Publication Data

US 2016/0321520 A1 Nov. 3, 2016

Related U.S. Application Data

(63) Continuation of application No. 14/099,199, filed on Dec. 6, 2013, now Pat. No. 9,208,400, which is a
(Continued)

(51) Int. Cl.
*G06K 9/52* (2006.01)
*G06T 19/20* (2011.01)
(Continued)

(52) U.S. Cl.
CPC .................. *G06K 9/52* (2013.01); *G06T 7/13* (2017.01); *G06T 7/344* (2017.01); *G06T 7/60* (2013.01);
(Continued)

(58) Field of Classification Search
None
See application file for complete search history.

(56) References Cited

U.S. PATENT DOCUMENTS 5,546,475 A    8/1996   Bolle et al.
6,173,066 B1   1/2001   Peurach et al.
(Continued)

FOREIGN PATENT DOCUMENTS

KR    10-0190737    6/1999

OTHER PUBLICATIONS

Wyngaerd et al., "Automatic Crude Patch Registration: Toward Automatic 3D Model Building", Computer Vision and Image Understanding, vol. 87, No. 1-3, Jul. 1, 2002, pp. 8-26.
(Continued)

*Primary Examiner* — Mark Roz
(74) *Attorney, Agent, or Firm* — Klein, O'Neill & Singh, LLP

(57) ABSTRACT

Information of different scans of physical objects may require comparison, for example to determine if the scans are of the same object or if an object has changed, or better information for a three dimensional model may be desired. Different scans of physical objects may be compared by determining lines or planes tangent to a surface at a discrete number of points, registering three dimensional information provided by the scans using the tangent lines or planes, and determining a measure of discrepancy between the surfaces. Three dimensional information of different scans of the same object may also be merged after determining lines or planes tangent to a surface at a discrete number of points and performing registration and merging.

9 Claims, 8 Drawing Sheets

Related U.S. Application Data continuation of application No. 12/371,473, filed on Feb. 13, 2009, now Pat. No. 8,605,989.

(51) Int. Cl.
*G06T 7/60* (2017.01)
*G06T 17/20* (2006.01)
*G06T 7/33* (2017.01)
*G06T 7/13* (2017.01)

(52) U.S. Cl.
CPC .............. *G06T 17/20* (2013.01); *G06T 19/20* (2013.01); *G06T 2207/10012* (2013.01); *G06T 2219/2004* (2013.01)

(56) References Cited

U.S. PATENT DOCUMENTS

| | | | |
|---|---|---|---|
| 6,236,403 B1 | 5/2001 | Chaki et al. |
| 6,381,346 B1 | 4/2002 | Eraslan |
| 6,476,803 B1 | 11/2002 | Zhang et al. |
| 6,975,750 B2 | 12/2005 | Yan et al. |
| 7,576,738 B2 | 8/2009 | Litke et al. |
| 2006/0078172 A1 | 4/2006 | Zhang et al. |
| 2007/0269080 A1 | 11/2007 | Hamanaka |
| 2009/0022405 A1 | 1/2009 | Griffin |

OTHER PUBLICATIONS

Wyngaerd et al., "Invariant-based registration of surface patches", Computer Vision, 1999. The Proceedings of the Seventh IEEE International Conference on Kerkyra, Greece, Sep. 20-27, 1999, Los Alamitos, CA, USA, IEEE Comput. Soc., US, vol. 1, Sep. 20, 1999.

Feldmar et al., "3D-2D projective registration of free-form curves and surfaces", Computer Vision and Image Understanding, vol. 65, No. 3, Mar. 1, 1997, pp. 403-424.

Bergevin et al. "Towards a General Multi-View Registration Technique." IEEE Transactions on Pattern Analysis and Machine Intelligence. 18.5 (1996): 540-547. Print.

Vijayakumar, et al. "Invariant-Based Recognition of Complex Curved 3D Objects from Image Contours." Proceedings of International Conference on Computer Vision. 5. (1995): 287-303.

Park et al. "Pose Estimation of Two-pose 3D Models using the Base Tangent Plane and Stability Constraints." VMV 2002. (2002): 379-386, Print.

Shapiro et al. Computer Vision: Chapter 14 3D Models and Matching. 1.1. Prentice Hall, 2000. 1-53. Web. <http://vvww.cs.washington.edu/education/courses/576/book/ch14.pdf>.

Ullman et al. "The Alignment of Objects with Smooth Surfaces." Report. Massachusetts Institute of Technology, 1988. Print.

Barequet et al. "Partial Surface and vol. Matching in Three dimensions." IEEE Transactions on Pattern Analysis and Machine Intelligence. 19.9 (1997): 929-949. Print.

International Search Report on corresponding PCT application (PCT/US2010/023948) from International Searching Authority (KIPO) dated Sep. 28, 2010.

Written Opinion on corresponding PCT application (PCT/US2010/023948) from International Searching Authority (KIPO) dated Sep. 28, 2010.

International Preliminary Report on Patentability for International Patent Application No. PCT/US2010/023948, dated Aug. 16, 2011.

U.S. Appl. No. 14/099,199, filed Dec. 6, 2013, Leonid I. Rudin Jose L. Lisani Jean-Michel Morel, US 2015-0161470 A1, Notice of Allowance dated Jul. 31, 2015.

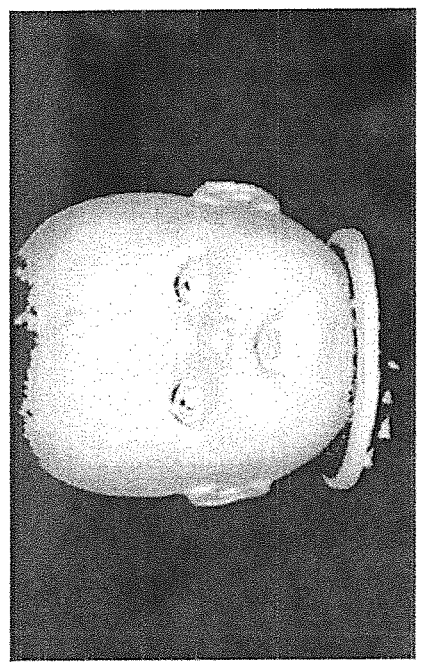
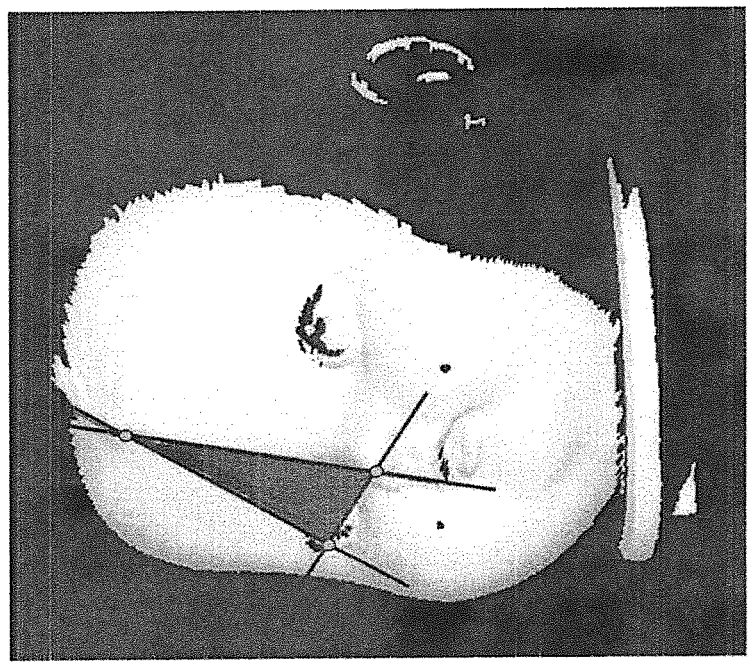
FIG. 2

REGISTRATION AND COMPARISON OF THREE-DIMENSIONAL OBJECTS

CROSS-REFERENCE TO RELATED APPLICATIONS

The present application is a continuation of U.S. patent application Ser. No. 14/099,199, filed Dec. 6, 2013, which is a continuation of U.S. patent application Ser. No. 12/371,473 filed. Feb. 13, 2009, now U.S. Pat. No. 8,605,989, the disclosures of which are incorporated by reference herein.

BACKGROUND OF THE INVENTION

The present invention relates generally to three dimensional object analysis, and more particularly to object recognition using three dimensional information.

Three dimensional scanners are used in a wide variety of applications. Such scanners may be used as part of an engineering design process, for example to capture information of a prototype design, a manufacturing process, for example to capture shape information of manufactured part, and in a wide variety of medical or security-related applications.

Determining if results of different scans represent the same object or if a known object has changed between scans, however, may be difficult.

BRIEF SUMMARY OF THE INVENTION

The present invention provides for object recognition and fusing, mosaicing, or supplementing of three dimensional model information of an object.

In one aspect the invention provides a method using a computer of determining congruence between physical objects, the physical objects each having a surface described by a model, comprising: determining, for a model of a first physical object, a first plurality of tangency points; determining, for the model of the first physical object, a first plurality of lines coupling tangency points that do not intersect a surface defined by the model of the first physical object in a vicinity of the tangency points coupled by the first plurality of lines; determining, for a model of a second physical object, a second plurality of tangency points; determining, for the model of the second physical object, a second plurality of lines coupling tangency points that do not intersect a surface defined by the model of the second physical object in a vicinity of the tangency points coupled by the second plurality of lines; registering the model of the first physical object and the model of the second physical object to a common coordinate system using the first plurality of lines and the second plurality of lines; determining a measure of discrepancy between the model of the first physical object and the second physical object; and declaring that the first physical object is the same as the second physical object if the measure of discrepancy is less than a predefined magnitude.

In another aspect the invention provides a method using a computer of determining if a first physical object is the same as a second physical object, comprising: receiving a model of a first physical object and a model of a second physical object, the model of the first physical object comprising a plurality of points descriptive of a surface of the first physical object and the model of the second physical object comprising a plurality of points descriptive of a surface of the second physical object; determining n-tangents for the model of the first physical object and the model of the second physical object; determining if aspects of the surface of the first model and aspects of the surface of the second model match within a predefined criteria; and declaring that the first physical object and the second physical object are the same physical object if the corresponding n-tangents match within the predefined criteria.

In another aspect the invention provides a computer system configured to determine groupings of points of tangency for models of physical objects, comprising: at least one memory containing program instructions and information defining a surface a physical object using a plurality of points; and a processor configured by the program instructions to: determine lines coupling pairs of points; for each line coupling pairs of points determine if the line cross the surface of the physical object about either of the pairs of points; and selecting lines coupling pairs of points that do not cross the surface of the physical object about either of the pairs of points.

These and other aspects of the invention are more fully comprehended upon review of this disclosure.

BRIEF DESCRIPTION OF THE DRAWINGS

FIG. 2 shows a visual representation of results of a scan and a further representation of results of a scan showing a tritangent plane.

DETAILED DESCRIPTION

Figure 1:
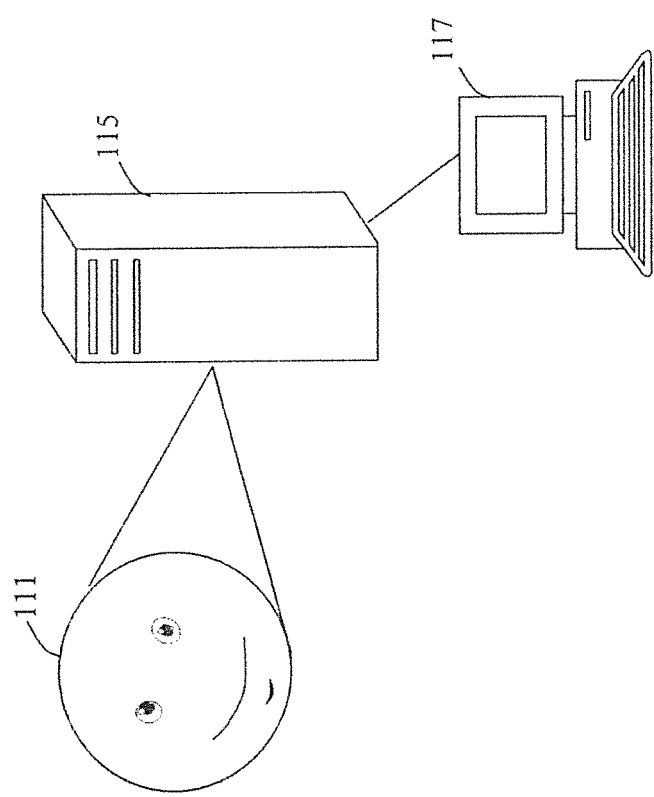
FIG. 1 illustrates a scanning and processing system in accordance with aspects of the invention.

FIG. 1 shows a scanning system for obtaining three dimensional information of an object 111. A three dimensional scanner 115 obtains three dimensional information of an object, generally by scanning the object. A number of three dimensional scanners are commercially available, and the three dimensional scanners may operate as a standalone device or in conjunction with a computer unit, for example discussed below, executing software generally provided by the three dimensional scanner vendor. In many embodiments the scanner obtains information about location in space of a plurality of points of the object. In many embodiment the points of the object are points on a surface of the object, although in some embodiments the points of the object may be points within an object, generally depending on the type of scanner.

The information about location in space of the plurality of points of the object is provided to a computer unit 117 coupled to the scanner, although in some embodiments the computer unit and three dimensional scanner may share a common housing or elements of the computer unit and three dimensional scanner may share some or all of a plurality of housings. The information about location in space of the plurality of points of the object may be in the form of data, for example distance and angle from a scanning device to each of the plurality of points on the object, with the computer unit for example determining information of a three dimensional model of the object. Alternatively, the information about location in space of the plurality of points may be in the form of information of a three dimensional model of the object. The three dimensional model of the object may be, for example for a surface of the object, in the form of a point cloud, with a plurality of points identified by location in a coordinate system The three dimensional model of the object alternatively may be, again for example for a surface of the object, in the form of a three dimensional mesh, with location and orientation of a plurality of polygons identified. In many such instances the polygons are planar triangles, and the location and orientation of the plurality of triangles is provided by way of identifying location of vertices of the triangles in a coordinate system. In many instances a graphic display device associated with the computer unit may, in conjunction with graphic display related circuitry of the computer unit, display representations of scans, and FIG. 2 shows a visual representation 211 of result of a scan.

The three dimensional scanner may also perform a second scan of a further object, to obtain information of a further three dimensional model. The further object may or may not be the same object as the object. In some embodiments the second scan is performed by a scanner other than the scanner 115.

The computer unit processes information of the three dimensional model and the further three dimensional model. In many embodiments the computer unit determines, based on the processing of the information, whether the three dimensional information and the further three dimensional information are models of the same object, namely that the scanned object and the scanned further object are the same object. In some embodiments, the computer may fuse, mosaic, or supplement three dimensional model information. For example, one set of three dimensional model information may be supplemented with information of the other set of the three dimensional model information, or the sets of three dimensional model information may be combined so as, for example, to provide more complete three dimensional model information.

Figure 3:
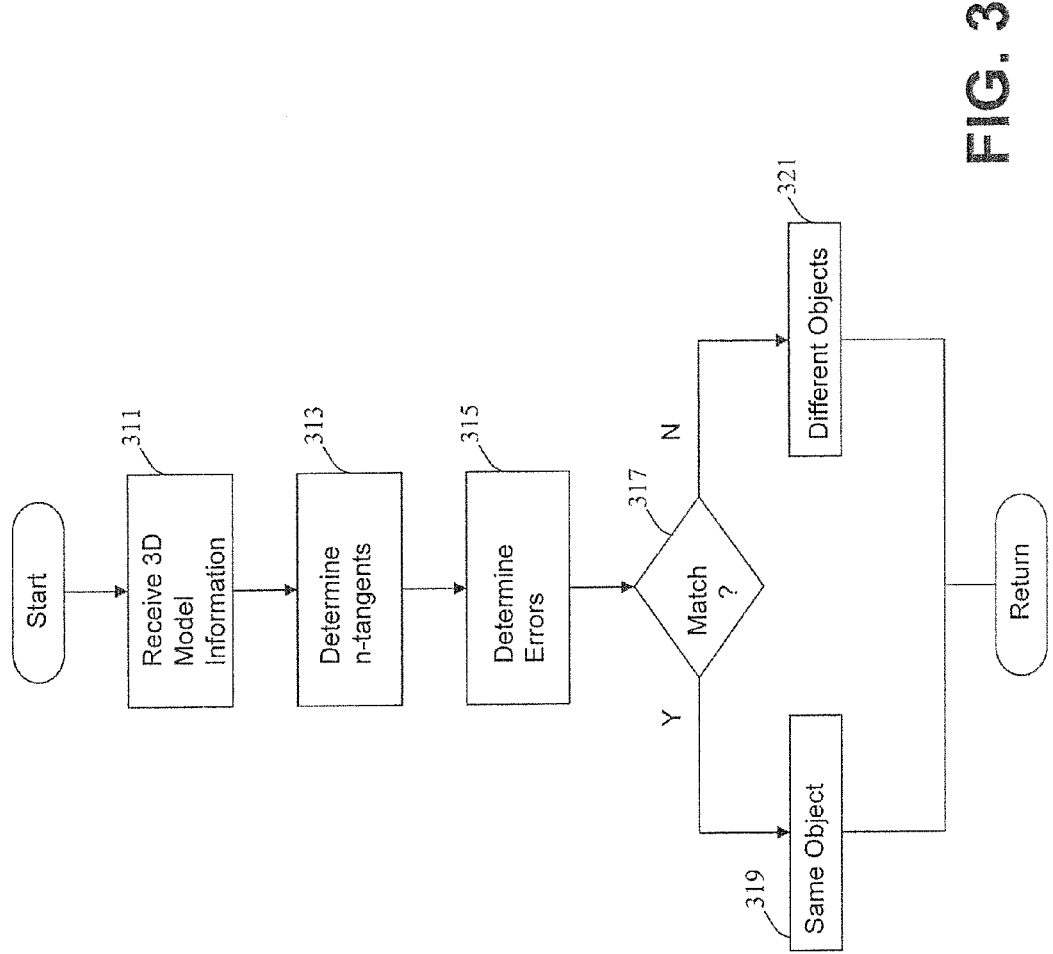
FIG. 3 shows a flow chart of a process for determining if scans of objects are scans of the same object.

FIG. 3 is a flowchart of a process for determining if objects are the same in accordance with aspects of the invention. The process may be performed, for example, by the system of FIG. 1, or a computer unit of the system of FIG. 1. In block 311 the process receives sets of three dimensional model information. At least two sets of information are received, with the sets of information being for the same or different physical objects. In most embodiments each of the sets of three dimensional model information are generated, at least in part, by scanners scanning three dimensional objects. In some embodiments each of the sets of three dimensional model information are representative of a surface of a head or portions of a head of person. In other embodiments the sets of three dimensional model information are representative of some other object, or may be information representative of items within a volume of an object, for example organs or other items within a body of a person. As indicated above, the three dimensional model information may, for example, define a plurality of planar polygons, generally triangles, forming a mesh indicative of a surface, or may, for example, be in the form of a point cloud with, in various embodiments, the point cloud being a volume point cloud or a surface point cloud.

In block 313 the process determines corresponding tangent lines or surfaces for different sets of the three dimensional model information. The tangent lines are, for each set of three dimensional model information, lines coupling points on a surface described by the three dimensional model information, with the lines generally tangent to the surface described by the three dimensional model information. In many embodiments it is sufficient if the tangent lines are only generally tangent to the surface in the vicinity of the points, which may at time be referred to as tangency points. Similarly, tangent surfaces are, for each set of three dimensional model information, defined by intersecting tangent lines. A tangent line couples two tangency points, a tangent surface, for example a tangent triangle, couples three tangency points. In some embodiments the number of coupled tangency points in the same plane is user defined, and may include two, three, or more tangency points, and may be considered an n-tangent, n greater than or equal to two. In addition, in some embodiments the three dimensional model information may be information simply of surfaces. In other embodiments the three dimensional model information may, for example, associate a brightness or color or other information with points in the model. In such instances edges of level sets of brightness or color, for example, may be used to define surfaces, some of which may be interior, of the three dimensional model information.

In some embodiments tangency points used to create n-tangents are restricted to tangency points that are distant from one another by a predefined, or in some embodiments adjustable, distance. Limiting the use of tangency points to those points greater than a minimum distance from one another is beneficial, for example, in avoiding selection of adjacent or nearly adjacent points for use in forming n-tangents, as use of such points may provide insufficient information regarding a surface of an object. In some embodiments the minimum distance may be, for example, 100 times the average distance between adjacent points in the three dimensional model information.

In some embodiments corresponding n-tangents between three dimensional model information may be determined. Corresponding n-tangents are comprised of tangent lines or surfaces with similar attributes. For example, corresponding tangent lines may be selected on the basis of similar lengths, and corresponding tangent triangles may be selected on the basis of similar area, similar angles for interior angles of the triangles, or similar lengths of some or all of the lines forming the triangles. In some embodiments the process determines that there are no corresponding n-tangents, and the process declares that the physical objects represented by the different sets of three dimensional model information are different objects. Similarly, in some embodiments the process, after determining corresponding n-tangents, declares that the physical objects represented by the different sets of three dimensional model information are the same object. In such embodiments the process may thereafter return, without performing further operations.

In block 315 the process determines discrepancies, which may be considered errors, between n-tangents, for example corresponding n-tangents. In most embodiments the errors between corresponding n-tangents relate to a measure of differences between the n-tangents and the corresponding surfaces in the three dimensional model information. A large variety of error constructs may be used. The error constructs may be in the form of a correlation measure, a global measure, or some other measure. For example, in some embodiments the process determines errors between corresponding n-tangents by comparing differences in areas, for the case of n equal to 2, or volumes, for cases where n is greater than 2, between the n-tangents and surfaces of the objects, with the surfaces as defined by the sets of three dimensional model information. In some embodiments a representation of the differences in area or volume are determined. For example, in many embodiments a number of discrete points on each n-tangent are selected, a distance between the point and the corresponding surface is determined, the distances are summed for each object, and differences in the summed distances are determined. In some embodiments the representation of the differences in area or volume is determined with respect to the number of discrete points used, with the distances are divided by the number of discrete points to provide an average distance in representation of area or volume, and differences in the average distances are determined. Other examples of determination of errors between corresponding n-tangents are also described later herein. In addition, in some embodiments errors between corresponding n-tangents may be determined by comparing errors between pairs of n-tangents, with one n-tangent of a pair for one three dimensional models and the other n-tangent of the pair for the other of the three dimensional models, and, for example, using the pairs with the lowest errors as corresponding n-tangents.

In block 317 the process determines if the errors are within a predefined amount. If so, the process proceeds to block 319 and declares that the sets of three dimensional model information are for the same object. Otherwise the process proceeds to block 321 and declares that the sets of three dimensional model information are for different objects. In either case, the process thereafter returns.

Figure 4:
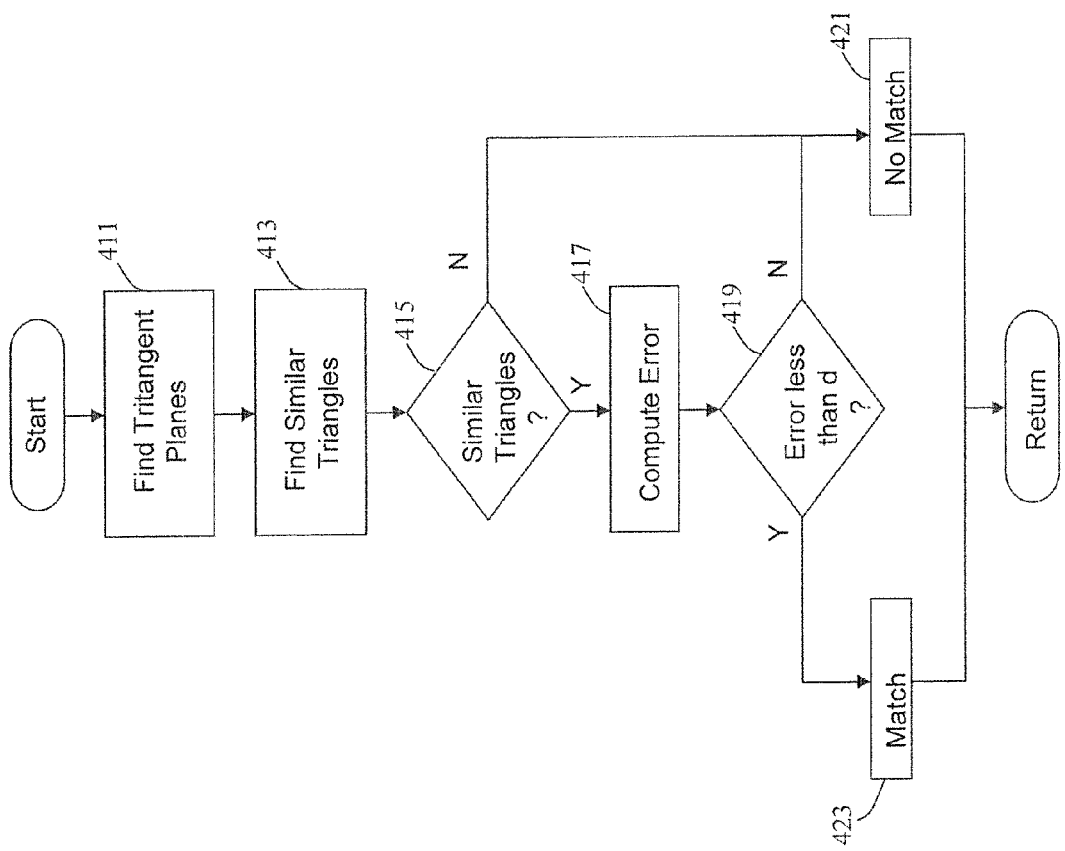
FIG. 4 shows a flow chart of a further process for determining if scans of objects are scans of the same object.

FIG. 4 is a flowchart of a further process of determining if objects are the same in accordance with aspects of the invention. In block 411 the process finds tritangent planes, or in many embodiments simply tritangent triangles, for two representations of surfaces (which in some embodiments may be interior surfaces) of three dimensional physical objects, which may or may not be the same physical object. An example of a tritangent plane 213 for a visual representation 215 of results of a scan is shown in FIG. 2. Each of the representations of three dimensional physical objects may comprise data indicating a point cloud representation, or may comprise data indicating polygons, usually planar, in space forming mesh representation of the physical objects. In many instances the planar polygons are planar triangles.

In some embodiments the process determines tritangent planes for each of the representations by determining three planar polygons that are, within some range, coplanar, namely with the planar polygons sharing, within some range, the same plane. In some such embodiments the planar polygons are declared coplanar if the planes of the polygons are within a predefined distance of one another, or if an angle of intersection of the planes of the polygons is smaller than a predefined amount. Further, in some embodiments the three planar polygons must also be greater than a predefined distance from one another. In some embodiments the process first determines two planar polygons that share a common plane, which may be considered bitangent lines or bitangents, and then determines a third planar polygon that also shares the common plane.

In some embodiments the process determines bitangents by considering straight lines that connect pairs of tangency points of the object, and selecting such straight lines that do not cross the surface of the planar polygons in the vicinity of the tangency points. In some embodiments planar polygons are determined using points of a point cloud representation. In some embodiments a manifold, representative of a surface of the object, or a surface ikn the vicinity of the tangency points is determined, with manifolds used in place of the polygons. In some embodiments the distance between the tangency points should be greater than a predefined distance. The process then determines if two different bitangents share a common tangency point, if so tangency points of the two bitangents form a triangle, and the triangle may be referred to as a tritangent or tritangent triangle.

In some embodiments block 413 is performed, although in some embodiments operations of block 413 are omitted. In block 413 the process determines if tritangents of the different representations are similar. In some embodiments tritangents are considered similar if they have a similar attribute. In some embodiments tritangents are considered similar if they have similar areas, for example areas that differ less than a predefined amount or percentage. In some embodiments tritangents are considered similar if, for example, for a first tritangent formed of points ABC and a second tritangent formed of points DEF |AC|/|AB|=alpha*|DE|/|DF|, with alpha some value approximately equal to 1.

In block 415 the process determines if similar tritangents were found. If not, the process goes to block 421 and declares that the three dimensional physical objects are different objects, and returns. Otherwise the process goes to block 417.

In block 417 the process determines an error between tritangents, the similar tritangents if operations of block 413 were performed. In some embodiments the process determines an error between similar tritangents by determining a difference between an average distance between corresponding points in both tritangents. In some embodiments the process determines an error, for triangles ABC and EPG, by using a transformation to map the triangles to a common plane, using the same transformation for surfaces of the three dimensional information of the objects, selecting points within the triangles, determining distances from the points to the surfaces, the distances being in a direction orthogonal to the planes of the triangles, and determining a difference between average distances for the points.

Accordingly, in some embodiments, for triangles ABC and DEF, A and D are mapped, generally by translation to an origin of an x-y-z coordinate system, vectors AB and DE are aligned, generally by rotation, with a positive axis of an x-axis of the coordinate system, and each triangle is rotated until points C and F are in the x-y plane. The same translations and rotations are performed for the surface of the three dimensional information of the objects.

Each of the triangles are discretized. The triangle may be discretized using, for example, a rectangular grid. Alternatively, areas outside the triangles may be discretized, or areas about the tangency points. In some embodiments only discretization points that, based on their x-y coordinates, would be within both triangles are used, providing N discrete points for each triangle. For each discrete point a distance, in the z-direction, is determined to the corresponding surface. In some embodiments the sum of the difference in distance between corresponding discretization points, divided by the number of discrete points is determined as a registration error. As indicated above, a number of measures of error, or discrepancy, may be used. For example, alternatively a maximum of the differences in distance may be determined as the error, or the differences may be computed with respect to frequency domain representations of each data set.

In some embodiments the discrete points are chosen such that distance between the discrete points is related to the average distance between neighboring points in the three dimensional mesh information, for example the distance between discrete points may be selected to be the same as the average distance between neighboring points in the three dimensional mesh information.

In block 419 the process determines if the error is less than some value d. In many embodiments d may be or may be based on an average distance between points in a point cloud or points in a three dimensional mesh. If the error is less than d, the process proceeds to block 423 and declares the physical objects to be the same. If not, the process proceeds to block 421 and declares the physical objects to be different. In either case the process thereafter returns.

Figure 5:
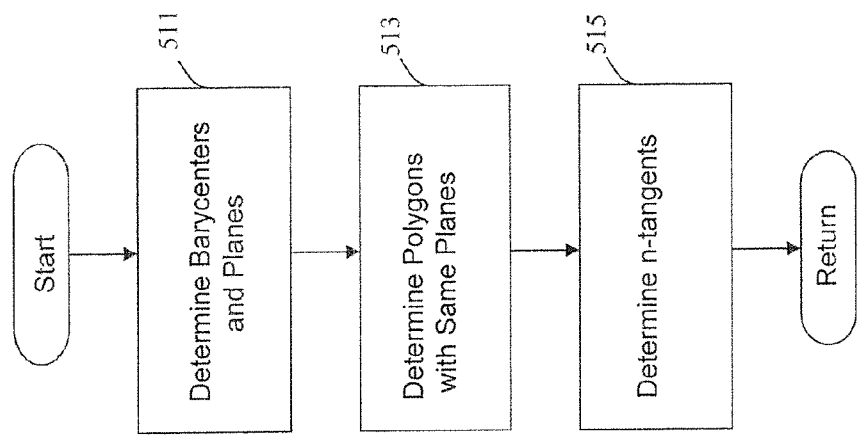
FIG. 5 shows a flow chart for determining n-tangents.

FIG. 5 is a flow chart of a process for determining n-tangents in accordance with aspects of the invention. In block 511 the process determines barycenters and planes for polygons of a mesh describing surfaces of a three dimensional object. In some embodiments the process is provided barycenter information for polygons of the mesh, with in most embodiments the polygons forming triangles with the barycenters within the triangle, along with apex positions of the triangles within a coordinate system.

In block 513 the process determines polygons with the same plane. In some embodiments two polygons are considered to have the same plane if an angle between the two planes is less than a threshold, for example a user defined threshold.

In some embodiments a mesh describing a surface of an object is formed of triangles, and may include n triangles. In such embodiments, each triangle may be identified as $T_i$, with I=1 . . . n. Triangles with the same plane may be determined by considering, for each triangle $T_i$, all triangles $T_j$, j>I, with distances from a barycenter of $T_i$ to a barycenter of $T_j$ greater than a user defined threshold, or a threshold based on average distances between barycenters (for example 50 times the average distance between barycenters), or some other distance. For all such triangles $T_j$, $T_j$ is coplanar with $T_i$ if the distance from the barycenter of $T_j$ to the plane of $T_i$ is less than a predefined distance and an angle between a plane of I; and a plane of $T_i$ is less than a predefined angle. In some embodiments the predefined angle is ten degrees.

In block 515 the process determines n-tangents defined by barycenters of n polygons having the same plane. In some embodiments a mesh describing a surface of an object is formed of triangles, and may include n triangles. In such embodiments a tritangent, for example, may be determined by performing the operation described for such embodiments with respect to block 513, but using triangle $T_j$ in place of triangle $T_i$, and determining a further triangle $T_k$, with k>j.

The process thereafter returns.

In some embodiments a cloud of points describing a surface of an object may be used instead of triangles. In such embodiments bitangent lines may be determined by, for all pairs of points, determining a line segment passing through the pair of points, determining a plane including one of the points and normal to the line, selecting points near one of the pair of points and selecting points near the other of the pair of points, projecting the selected points to the plane, determining vectors from the one of the points included in the plane and the projected points, and determining if the maximum angle between any two of the vectors is less than 180 degrees. N-tangents may be similarly determined, for example by repeating the above, or by determining bitangent line segments that intersect, or for a third point, determining a plane including the pair of points and the third point and determining if all of the points near the pair of points and the third point are on the same side of the plane. In some embodiments points near the pair of points may be determined by determining if the points are within a predefined distance of either of the pair of points or forming a region of planar polygons, for example having vertices of points, about the pair of points and determining points that are part of a polygon within a number of polygons, for example within neighboring polygons, about either of the pairs of points, or some other measure.

Figure 6:
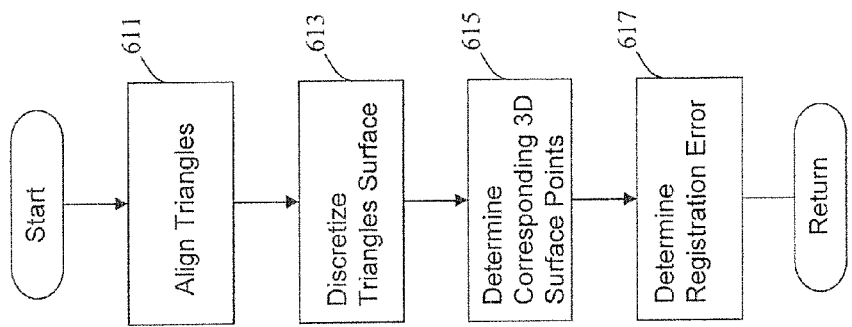
FIG. 6 shows a flow chart for determining registration errors.

FIG. 6 is a flow diagram of an embodiment of a process for determining registration errors for tritangents in accordance with aspects of the invention. In block 611 the process aligns triangles formed of the tritangents. In many cases the position of triangle apexes of the tritangents, for example, may have different locations in coordinate systems of the three dimensional model information from which each tritangent is derived. Aligning triangles, along with performing the same transformation done with respect to alignment of triangles for other information of the three dimensional model information, can both allow for easier processing for determination of registration error and largely register both sets of three dimensional model information substantially in the same coordinate system.

In some embodiments alignment of triangles is performed by translating a first apex of each triangle to an origin of an x-y-z coordinate system. A first leg of each triangle, extending from the first apex, is then rotated, if necessary, to align with an x-axis of the coordinate system. A second leg of each triangle, also extending from the first apex, is rotated to lie in an x-y plane of the coordinate system. In some embodiments, more generally an affine transformation is applied to the first triangle to position the first triangle as discussed above, and an affine transformation is applied to the second triangle to place the second triangle in the same position as the first triangle. The same transformation, of translations, rotations, and possibly zooms, is performed for other information for each of the three dimensional model information.

In block 613 the process selects a number of discrete points of each triangle. In some embodiments each of the discrete points is separated by a predefined distance. In some such embodiments it has been found useful to have the predefined distance be the same as the average distance between points in the three dimensional model information, or the average distance between barycenters of polygons of the three dimensional model information. Accordingly, in some embodiments the process selects discrete points across the surface of each triangle such that each discrete point is separated by the predefined distance, with as many discrete points used as may be selected within the surface of the triangle that meet this criteria.

In block 615 the process determines corresponding surface points of each of the transformed three dimensional model information for each of the discrete points. Each of the corresponding surface points have the same x and y values of corresponding discrete points, but may have different z values.

Figure 7:
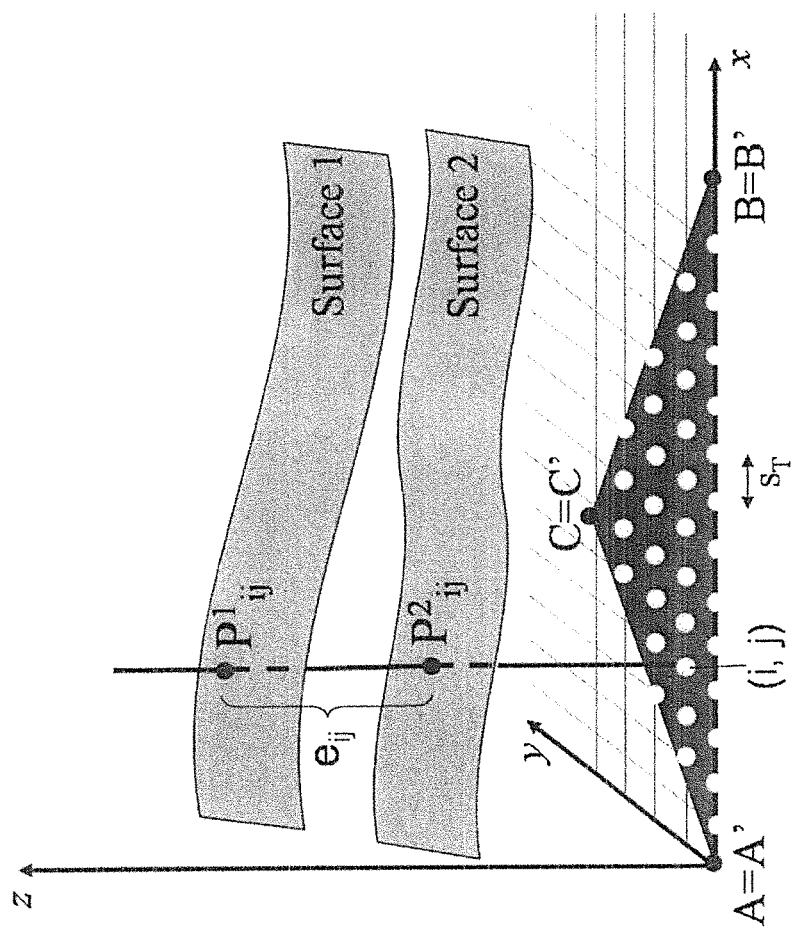
FIG. 7 illustrates a triangle and two surfaces in a coordinate system with respect to determination of registration errors.

In block 617 the process determines a registration error between the surfaces of the transformed three dimensional model information. For each of the discrete points the registration error is the distance, in the z-direction, between corresponding points of the two surfaces. An example of a registration error for a particular discrete point is shown in FIG. 7. In FIG. 7 a triangle ABC and a triangle A'B'C' are shown in an x-y plane of an xyz coordinate system. A plurality of discrete points are within the triangles. A surface 1 and a surface 2 are shown above the x-y plane, although it should be recognized that the surfaces will generally be tangent to the x-y plane at points A, B, C (which also correspond to A', B', C'). A point P1 on surface 1 is a corresponding point for a particular discrete point i,j, and a point P2 on surface 2 is also a corresponding point for the particular discrete point i,j. A registration error for the particular discrete point i,j is a distance $e_{ij}$ between point P1 and point P2. It should be noted, however, that in some embodiments points outside the triangle are included, and in some embodiments only included, in the plurality of discrete points.

In some embodiments a total registration error is determined, namely the sum of the registration error for each of the discrete points. However, it is generally useful to instead determine an average registration error, for example the sum of the registration error for each discrete point divided by the number of discrete points, or a median or maximum registration error or some other type of registration error. As indicated above, however, a variety of different characterizations of registration error may be used.

The process of FIG. 6 thereafter returns.

Figure 8:
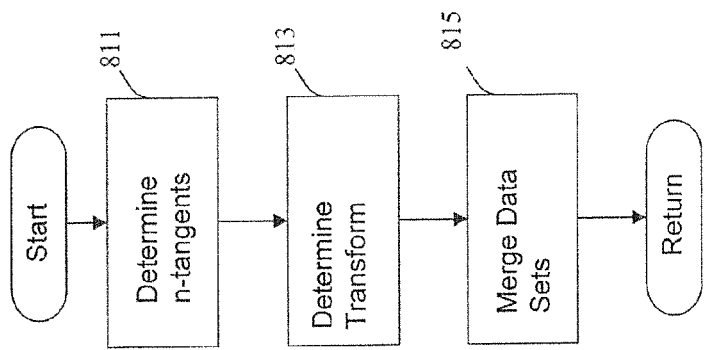
FIG. 8 shows a flow chart of a process for fusing, mosaicing or supplementing information of two scans of the same object.

FIG. 8 is a flow chart of a further process in accordance with aspects of the invention. The process of FIG. 8 fuses, generates a mosaic of or supplements three dimensional information, generally from separate three dimensional model information of the same physical object but in some embodiments from three dimensional model information of different physical objects. For a variety of reasons, three dimensional model information generated by a scanning device may not frilly generate information for a surface or a volume of an object, leaving holes or gaps within the information.

In block 811 the process determines n-tangents for three dimensional information generated by scans of the same physical object. In many embodiments the process determines n-tangents as discussed herein, for example by determining tritangent triangle based on tangency points.

In block 813 the process determines a transform (or a transform for each scan) to map information from one (or more) of the scans to information of a single scan, or, more generally, to map information from the scans to a common coordinate system. Again, determination of the transform may be performed as discussed herein. In many embodiments the transform is a rigid transform, although in some embodiments a non-rigid transform may be used.

In block 815 the process merges data of the scans. In many embodiments merging of data of the scans is performed by applying the transform to points in the scans to a common coordinate system. In some embodiments, the merged data is additionally filtered or smoothed, for example, to reduce noise or effects of inconsistencies in the merged data. For example, in some embodiments, local or near data points are averaged, or the merged data may be or tessellated, for example using cubes, and points within each cube are assigned an average position of points within the cube. The process thereafter returns.

In some embodiments of the invention other or an additional process or additional processes are performed to transform three dimensional information to a common coordinate system. In some embodiments local curves from each of the sets of three dimensional model information are extracted, the local curves are encoded, meaningful matches are determined between the local curves, and a transform to map local curves with meaningful matches, or local curves with the most meaningful match, is determined.

In some such embodiments tritangents for two sets of three dimensional information are determined, and intersections between the additional planes and surfaces of the three dimensional information are determined. The additional planes may be planes parallel to planes defined by the tritangents, offset by a selected distance d, or may be planes forming an angle with planes defined by the tritangents and intersecting a side of a triangle formed by the tritangents. In some embodiments the distance d is related to an aspect of, for example, a tritangent area, with d having the same relation to tritangent area for each tritangent. Preferably the additional planes are selected such that the intersection with the surfaces of the three dimensional information are Jordan curves.

The curves are encoded using a similarity or affine invariant encoding, with in most embodiments similarity encoding being used. Meaningful matches are determined for corresponding curves, and a geometric transform mapping one of the corresponding curves to the other, or transforms mapping both to common positions in a common coordinate system, is determined. Points of the three dimensional model information, or barycenters in the case of three dimensional model information comprised of polygon information, are transformed using the transformation, preferably for each of the geometric transforms. A measure of meaningfulness is associated with clusters of points for each of mappings, and a transform with the most meaningful clusters is selected for transforming information of the three dimensional models for further processing, for example for computing registration errors.

Although the invention has been described with respect to specific embodiments, it should be recognized that the invention may be practiced other than as specifically described. Accordingly, the invention comprises the novel and unobvious claims and their insubstantial variations, supported by this disclosure.

The invention claimed is:

1. A method using a computer of determining congruence between physical objects, the physical objects each having a surface described by a model, comprising:
   determining, for a model of a first physical object, a first plurality of tangency points;
   determining, for the model of the first physical object, a first plurality of lines coupling tangency points that do not intersect a surface defined by the model of the first physical object in a vicinity of the tangency points coupled by the first plurality of lines;
   determining, for a model of a second physical object, a second plurality of tangency points;
   determining, for the model of the second physical object, a second plurality of lines coupling tangency points that do not intersect a surface defined by the model of the second physical object in a vicinity of the tangency points coupled by the second plurality of lines;
   registering the model of the first physical object and the model of the second physical object to a common coordinate system using the first plurality of lines and the second plurality of lines;
   determining a measure of discrepancy between the model of the first physical object and the second physical object; and
   declaring that the first physical object is the same as the second physical object if the measure of discrepancy is less than a predefined magnitude.

2. The method of claim 1 wherein the first number of tangency points is 3 tangency points, the first number of lines is 3 lines, the second number of tangency points is 3 tangency points, and the second number of lines is 3 lines.

3. The method of claim 2 wherein registering the model of the first physical object and the model of the second physical object to a common coordinate system using the first plurality of lines and the second plurality of lines comprises determining a transform to place a first triangle formed by the first plurality of lines to a position in a coordinate system, determining a transform to place a second triangle formed by the second plurality of lines to the position of the first triangle, and transforming points of the model of the first physical object.

4. The method of claim 3 wherein the first transform is a null transform.

5. The method of claim 3 wherein determining a measure of discrepancy between the model of the first physical object and the second physical object comprises determining a measure of differences in position of at least some corresponding points of surfaces of the transformed first model and the transformed second model.

6. The method of claim 5 wherein the at least some corresponding points are approximate the first triangle or the second triangle.

7. The method of claim 1 further comprising merging information of the first model and information of the second model.

8. The method of claim 1 wherein registering the model of the first physical object and the model of the second physical object to a common coordinate system using the first plurality of lines and the second plurality of lines comprises:
    extracting first local curves from the model of the first physical object by determining intersections with a surface defined by the model of the first physical object and a plane associated with the first plurality of lines;
    extracting second local curves from the model of the second physical object by determining intersections with a surface defined by the model of the second physical object and a plane associated with the second plurality of lines;
    encoding the first local curves and the second local curves determining meaningful matches between the local curves;
    determining a first transform to map the first local curves with meaningful matches and a second transform to map the second local curves with meaningful matches to a common position on a coordinate system; and
    applying the first transform to information of the model of the first physical object and applying the second transform to information of the model of the second physical object.

9. The method of claim 8 wherein the first local curves and the second local curves are Jordan curves.

* * * * *

UNITED STATES PATENT AND TRADEMARK OFFICE
CERTIFICATE OF CORRECTION

PATENT NO. : 9,904,870 B2
APPLICATION NO. : 14/960113
DATED : February 27, 2018
INVENTOR(S) : Leonid I. Rudin, Jose L. Lisani and Jean-Michel Morel Page 1 of 1

It is certified that error appears in the above-identified patent and that said Letters Patent is hereby corrected as shown below:

On the Title Page

• In page 2, Column 2 (Other Publications), Line 16, delete "<http://vvww." and insert --<http://www.--, therefor.

In the Specification

• In Column 6, Line 33, delete "EPG," and insert --EFG,--, therefor.

• In Column 7, Line 40, delete "I;" and insert --$T_i$--, therefor.

• In Column 7, Line 40, delete "$T_i$" and insert --$T_j$--, therefor.

• In Column 9, Line 24, delete "of" and insert --of,--, therefor.

• In Column 9, Line 30, delete "frilly" and insert --fully--, therefor.

Signed and Sealed this
Twenty-eighth Day of May, 2019

Andrei Iancu
*Director of the United States Patent and Trademark Office*